United States Patent
Mooren et al.

(10) Patent No.: US 12,324,438 B2
(45) Date of Patent: Jun. 10, 2025

(54) SYSTEM AND METHOD FOR PROCESSING A CARCASS PART

(71) Applicant: Marel Poultry B.V., Av Boxmeer (NL)

(72) Inventors: Mike Christiaan Maria Mooren, Av Boxmeer (NL); Maurice Eduardus Theodorus Van Esbroeck, Av Boxmeer (NL); Paul Godefridus Gerardus Arnts, Av Boxmeer (NL)

(73) Assignee: Marel Poultry B.V., Av Boxmeer (NL)

( * ) Notice: Subject to any disclaimer, the term of this patent is extended or adjusted under 35 U.S.C. 154(b) by 0 days.

(21) Appl. No.: 18/577,629

(22) PCT Filed: Jul. 8, 2022

(86) PCT No.: PCT/NL2022/050394
§ 371 (c)(1),
(2) Date: Jan. 8, 2024

(87) PCT Pub. No.: WO2023/287280
PCT Pub. Date: Jan. 19, 2023

(65) Prior Publication Data
US 2024/0315264 A1    Sep. 26, 2024

(30) Foreign Application Priority Data

Jul. 13, 2021 (NL) .................................... 2028710

(51) Int. Cl.
*A22C 21/00* (2006.01)
(52) U.S. Cl.
CPC ...... *A22C 21/0023* (2013.01); *A22C 21/0053* (2013.01); *A22C 21/0092* (2013.01)
(58) Field of Classification Search
CPC ............ A22C 21/0023; A22C 21/0092; A22C 21/0053
(Continued)

(56) References Cited

U.S. PATENT DOCUMENTS 4,723,339 A    2/1988    van de Nieuwelaar et al.
5,176,563 A *  1/1993    van den Nieuwelaar ................... A22C 21/0023
                                                                      452/167

(Continued)

FOREIGN PATENT DOCUMENTS

EP    159076 A1    10/1985
EP    0164167 A1   12/1985
(Continued)

OTHER PUBLICATIONS

International Search Report and Written Opinion in corresponding International Application No. PCT/NL2022/050394, dated Oct. 13, 2022 (11 pages).

*Primary Examiner* — Richard T Price, Jr.
(74) *Attorney, Agent, or Firm* — Osha Bergman Watanabe & Burton LLP

(57) ABSTRACT

The invention relates to a system for processing a slaughtered poultry carcass part at least comprising a back portion and legs, comprising a conveyor for moving the carcass part, suspended, in a conveying direction, and comprising a groin skin cutting device for cutting groin skin while the carcass part is moved past said cutting device, comprising a cutter having an elongate base portion having a cutting edge, a puncturing tip at an upstream end of the cutter, the cutter positioned and configured such that, the puncturing tip punctures groin skin upon movement of the carcass part in the conveying direction thereby creating a puncture hole so that the cutter enters underneath the groin skin, wherein the groin skin is cut by the cutting edge making a cut through the groin skin starting from the puncture hole, as a result of the continued movement of the carcass part.

14 Claims, 4 Drawing Sheets

(58) Field of Classification Search
USPC .......................................................... 452/149
See application file for complete search history.

(56) References Cited

U.S. PATENT DOCUMENTS

| | | | |
|---|---|---|---|
| 9,375,020 B2* | 6/2016 | Peters | ................ A22C 21/0023 |
| 2005/0059334 A1 | 3/2005 | Haley et al. | |
| 2015/0296814 A1* | 10/2015 | Peters | ................ A22C 21/0069 |
| | | | 452/166 |

FOREIGN PATENT DOCUMENTS

| | | |
|---|---|---|
| EP | 0369544 A1 | 5/1990 |
| EP | 0459580 A1 | 12/1991 |
| EP | 0853884 A1 | 7/1998 |
| JP | 3218011 U | 9/2018 |
| WO | 2017-070701 A1 | 4/2017 |

* cited by examiner

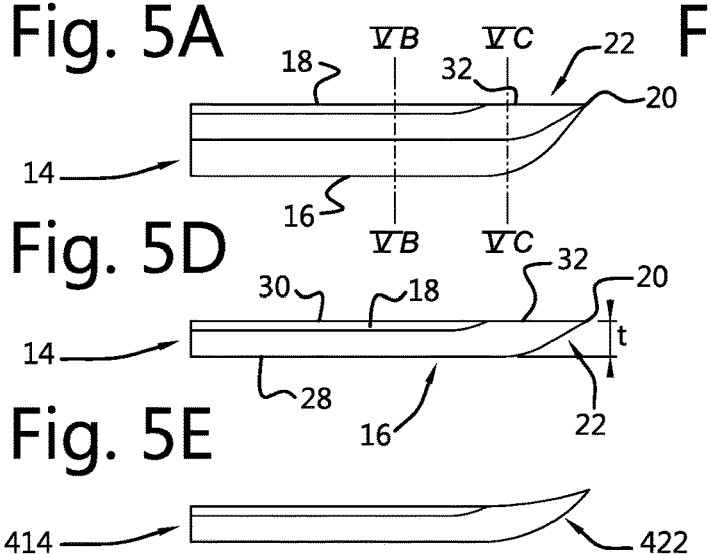
Fig. 5A
Fig. 5B
Fig. 5C
Fig. 5D
Fig. 5E
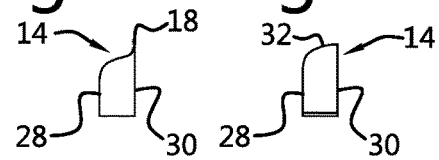
Fig. 6A
Fig. 6B
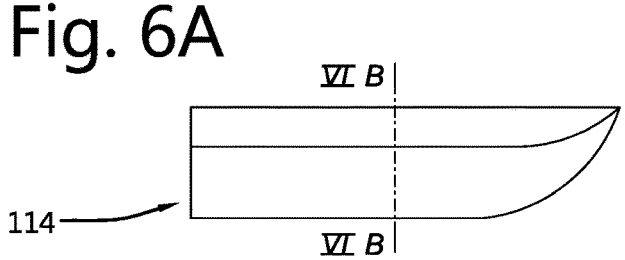
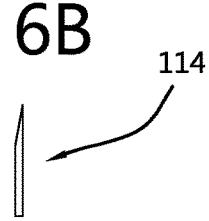
Fig. 6C
Fig. 6D
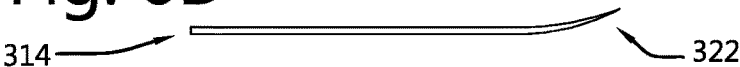
Fig. 7A
Fig. 7B
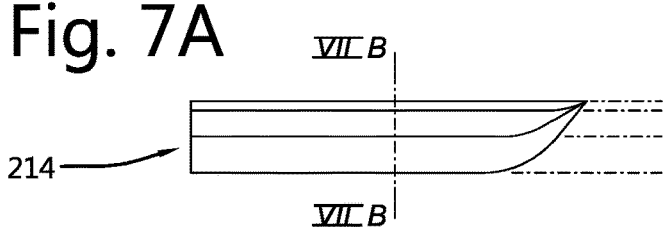
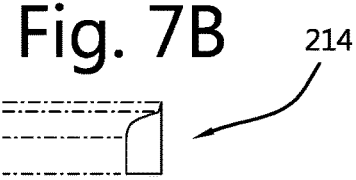
Fig. 7C
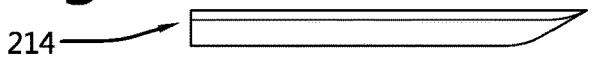

SYSTEM AND METHOD FOR PROCESSING A CARCASS PART

The invention relates to a system and a method for processing a carcass part, preferably a backhalve, the carcass part at least comprising a back portion and legs connected thereto.

It is an object of the invention to provide a system and method for processing such a carcass part, which makes possible an improved separation of a leg from the back portion. It is another object of the invention to provide a system and method for processing such a carcass part, in which possible contamination remaining on a leg after the separation thereof from the back portion is reduced. A still other object of the invention is to provide a system and method by means of which groin skin may be cut in a reliable and accurate manner.

One or more of the above objects are achieved by the system and method according to the invention. In a first aspect of the invention a system is provided, for processing a slaughtered poultry carcass part at least comprising a back portion and legs connected thereto. The system comprises a conveyor for moving the carcass part in a suspended manner in a conveying direction with the legs hanging from the conveyor in use of the system. The system further comprises a groin skin cutting device for cutting groin skin while the carcass part is moved past the groin skin cutting device in use. The groin skin cutting device comprises a cutter, preferably a stationary cutter, having an elongate base portion having a cutting edge, a puncturing tip at an upstream end of the cutter. The stationary cutter has been positioned and configured such that, in use, the puncturing tip punctures groin skin upon moving of the carcass part in the conveying direction thereby creating a puncture hole so that the cutter enters underneath the groin skin, wherein the groin skin is cut by the cutting edge making a cut through the groin skin starting from the puncture hole, as a result of the continued movement of the carcass part in the conveying direction in use.

An effect of the provision of the groin skin cutting device, wherein groin skin is punctured and subsequently cut, is that groin skin can be cut very efficiently and in an accurate manner. This allows the effective separation of at least a part of the groin skin which should not remain connected to the leg after a subsequent separation of the leg from the back portion. This is because such at least part of the groin skin is considered unhygienic because it originates from a part of the carcass close to the cloaca and may thus be contaminated. In this regard it is noted that groin skin is skin between the legs and the cloaca.

This in contrast to prior art methods in which such a specific puncture and subsequent cut is not made, which may result in a relatively large amount of groin skin remaining connected to the leg after a separation of the leg from the back portion. Such a remaining part of the groin skin connected to the leg is normally not directly attached to meat, but hangs loose like a flap, which is also unwanted for commercial reasons. In such prior art methods, the mentioned part of the groin skin then needs to be manually cut off after that the legs have been separated from the back portion, which involves relatively many operators along the processing line, which is unwanted from a cost point of view. Also the provision of the groin skin cutting device according to the invention, in which groin skin is punctured and subsequently, cut, a very precise, predetermined location of the cut in the groin skin may be achieved. As a result, the amount of groin skin remaining connected to the legs may be effectively reduced.

In an embodiment, the cutter is wedge shaped at least at the upstream end thereof, for tensioning groin skin for the purpose of making the cut through the groin skin. Tensioning groin skin makes the cutting more reliable and accurate.

In an embodiment, the cutter is positioned and configured such that, in use, the slaughtered poultry carcass part passes with a leg thereof at an outside of the cutter along an outer longitudinal side of the cutter which outer longitudinal side faces an inside of the leg in use. The base portion may have a thickness adapted to a largest thickness of the wedge shaped upstream end, wherein the cutting edge is provided at an inner longitudinal side of the cutter opposite to the outer longitudinal side. This way, groin skin is kept tensioned also during the cutting.

The upstream end of the cutter may be curved inward, seen in plan view. This means curved away from the mentioned outer longitudinal side. This decreases the chance that the cutter inadvertently punctures leg meat instead of groin skin.

The cutter may be angled inward, seen in plan view. This also decreases the chance that the cutter inadvertently punctures leg meat instead of groin skin while the carcass part passes with the leg thereof at an outside of the cutter.

In an embodiment, the cutter comprises a guiding portion at the upstream end of the cutter, wherein the cutting edge starts downstream of the guiding portion. The guiding portion may have the mentioned wedge-shape. The cutter may be positioned and configured such that, in use, after that the puncturing tip has created the puncture hole so that the cutter enters underneath the groin skin, the groin skin slides over the guiding portion towards the cutting edge and is subsequently cut by the cutting edge making the cut through the groin skin. The provision of the guiding portion increases the effectiveness of the tensioning of the groin skin prior to the cutting, and thereby the reliability and accuracy of the cutting.

In an embodiment, the groin skin cutting device has two such cutters disposed besides each other in a mirror-image manner, for cutting groin skin along an inside of both legs of the carcass part. The system may further have a leg positioning device upstream of the cutter, for spreading the legs apart and positioning the legs for the purpose of the subsequent groin skin cutting. This improves the accuracy of the puncturing and the subsequent cutting.

In an embodiment, the system further comprises a back supporting device which is movable in the conveying direction and arranged to support the back portion at least while the carcass part passes along the cutting device. A speed of movement of the back supporting device may in an embodiment be set equal to the speed of movement of the conveyor. Supporting the back portion of the carcass part at least during the cutting by the cutting device assists in increasing the reliability and accuracy of the cutting. Also, the back supporting device may lift the back portion at least while the carcass part passes along the cutting device. Such lifting results in the legs moving apart which in turn increases the available space for the puncturing and cutting by the cutting device. Another effect of the lifting of the back portion is that groin skin may be crumpled up. The reason for the crumpling up is that the orientation of the legs with respect to the back part changes. Crumpling up the groin skin increases the chance that the cutter punctures the groin skin and not misses the groin skin while the carcass part moves past the cutter. In an embodiment comprising a leg positioning device, the groin skin is preferably crumpled up, that means the back portion is preferably lifted by the back supporting device, while the carcass part passes the leg positioning device.

In an embodiment, the cutting device has a bypass element configured such that in use the cutter is selectively bypassed by the carcass part so that the puncturing tip is prevented from puncturing groin skin upon movement of the carcass part in the conveying direction and thereby preventing the groin skin to be cut by the cutting edge. In an embodiment, the cutting device further has a bypass element movable between a first position in which, in use, the puncturing tip punctures groin skin upon movement of the carcass part in the conveying direction past the groin skin cutting device, and a second position in which the bypass element covers at least the puncturing tip of the cutter such that the puncturing tip is prevented from puncturing groin skin upon movement of the carcass part in the conveying direction and thereby preventing the groin skin to be cut by the cutting edge. The provision of such a bypass element may increase the versatility of the system, because this way, the cutter of the cutting device may easily and effectively be bypassed if needed, such as temporarily, in case a specific batch of poultry carcass parts are processed for which the specific groin skin cut is not needed. In another embodiment, the cutting device may have a bypass element which is configured to move the cutter between a first position in which, in use, the puncturing tip punctures groin skin upon movement of the carcass part in the conveying direction past the groin skin cutting device, and a second position in which the cutter is moved out of reach of the groin skin such that the puncturing tip is prevented from puncturing groin skin upon movement of the carcass part in the conveying direction and thereby preventing the groin skin to be cut by the cutting edge. In an embodiment, the cutter is positioned such that the back portion of the carcass part passes underneath the cutter in use, wherein the cutting edge is tilted downwards with the upstream end thereof, seen transverse to the conveying direction.

In case of the embodiment having the back supporting device, the cutting edge is preferably tilted downwards with the upstream end thereof with respect to a supporting surface of the back supporting device below the cutting device. The tilted down orientation of the cutting edge further assists in keeping the groin skin tensioned during the cutting.

In an embodiment, the system further comprises a separation device which is provided downstream of the cutter and which is configured for separating the legs from the back portion. The separation device may comprise a cutting element such as a circular rotating blade cutting through or near the hip joints, for example, or may comprise a pulling element, pulling the back portion downward with respect to the legs for the purpose of the separation of the legs from the back portion as a result of the pulling action.

In an embodiment, the carcass part is a backhalve of a slaughtered poultry carcass, the backhalve comprising a back portion and legs connected thereto and which backhalve is moved by a conveyor in a suspended manner in a conveying direction with the legs hanging from the conveyor in use of the system.

Corresponding embodiments of the system as presented throughout the description and claims are also applicable to the below described method according to the second aspect of the present invention. The system according to the first aspect of the present invention may be arranged for carrying out the method according to a second aspect of the invention.

In a second aspect, the invention provides a method of processing a carcass part of a slaughtered poultry carcass, the carcass part preferably being a backhalve, using a system according to the invention as described above, the carcass part at least comprising a back portion and legs connected thereto, the method comprising moving the carcass part in a suspended manner by a conveyor in a conveying direction, with the legs hanging from the conveyor; and comprising, while the carcass part moves past the groin skin cutting device: puncturing groin skin with the puncturing tip of the cutter, and then cutting groin skin by the cutting edge.

Effects of the method according to the present invention and embodiments thereof are analogue to the effects of the system, and embodiments thereof, according to the first aspect of the invention as described above.

In an embodiment of the cutter having the guiding portion at the upstream end of the cutter, wherein the cutting edge starts downstream of the guiding portion, according to the method, after that the puncturing tip has created the puncture hole so that the cutter enters underneath the groin skin, the groin skin slides over the guiding portion towards the cutting edge and is subsequently cut by the cutting edge making the cut through the groin skin.

In an embodiment having the leg positioning device upstream of the cutter, the legs are spread apart and positioned using the leg positioning device, for the purpose of the subsequent groin skin cutting.

In an embodiment having the back supporting device, the back portion is supported, preferably lifted while being supported, by the back supporting device at least while the carcass part passes along the cutting device, that means at least during the cutting.

In an embodiment, groin skin may be crumpled up upstream of the cutter, which means prior to the cutting. Such crumpling up may be provided for by a lifting of the back portion by the back supporting device. In an embodiment also having the leg positioning device, the groin skin is preferably crumpled up while the carcass part passes the leg positioning device.

In general terms the present invention relates to a system and method for processing a carcass part of a slaughtered poultry carcass comprising a back portion and legs, comprising a conveyor for moving the carcass part, suspended, in a conveying direction, and comprising a groin skin cutting device for cutting groin skin while the carcass part is moved past said cutting device, comprising a cutter having an elongate base portion having a cutting edge, a puncturing tip at an upstream end of the cutter, the cutter positioned and configured such that, the puncturing tip punctures groin skin upon movement of the carcass part in the conveying direction thereby creating a puncture hole so that the cutter enters underneath the groin skin, wherein the groin skin is cut by the cutting edge making a cut through the groin skin starting from the puncture hole, as a result of the continued movement of the carcass part.

The present invention is described hereinafter with reference to the accompanying schematic drawings in which embodiments of the present invention are shown and in which like reference numbers indicate the same or similar elements.

FIGS. 5a, and 5d show an embodiment of a cutter of a system according to the invention, in side view and top view.

Figure 8A:
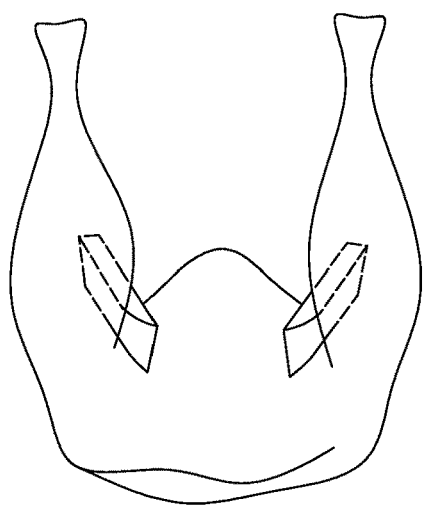
Figure 8B:
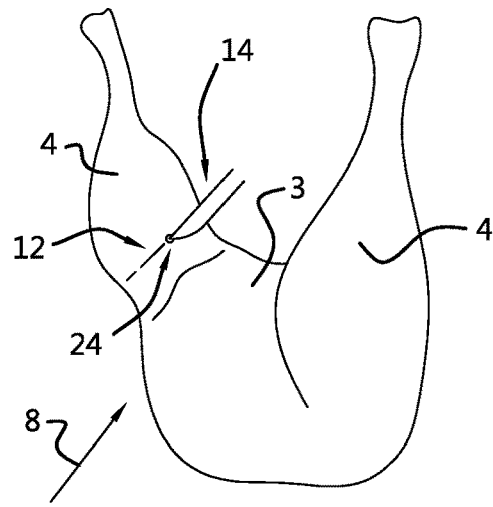
Figure 8C:
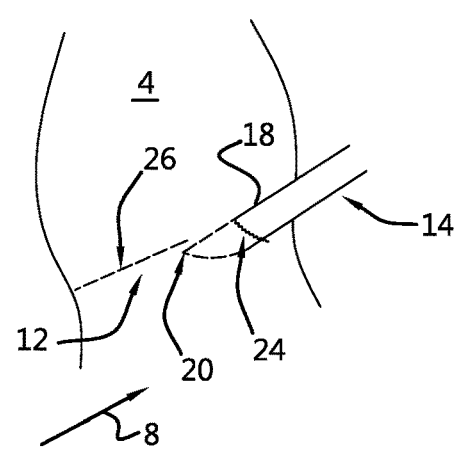

FIGS. 5b and 5c show sections Vb-Vb and Vc-Vc, respectively, of FIG. 5a;

FIG. 5e shows a variant of the embodiment of FIGS. 5a-5d, in top view;

FIGS. 6a and 6c show another embodiment of a cutter of a system according to the invention, in side view and top view;

FIG. 6b shows section VIb-VIb of FIG. 6a;

FIG. 6d shows a variant of the embodiment of FIGS. 6a-6c, in top view;

FIGS. 7a and 7c show yet another embodiment of a cutter of a system according to the invention, in side view and top view;

FIG. 7b shows section VIIb-VIIb of FIG. 7a;

FIG. 8a shows an embodiment of a method step of a method according to the invention, wherein a poultry carcass part is viewed in the conveying direction;

FIG. 8b shows the embodiment of FIG. 8a viewed under an angle from the side;

FIG. 8c shows a detail of FIG. 8b; and

Figure 9:
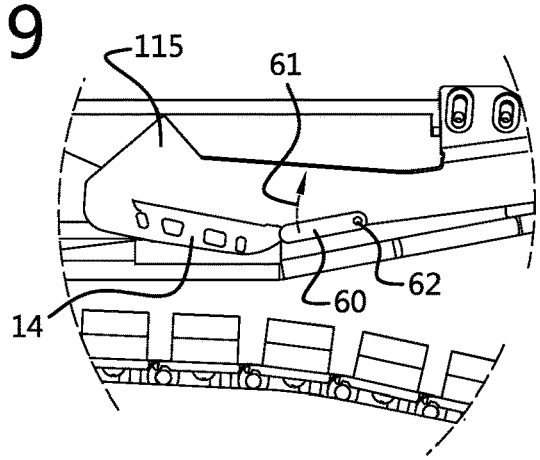

FIG. 9 shows, in side view, another embodiment of a cutting device of a system according to the invention.

Figure 1:
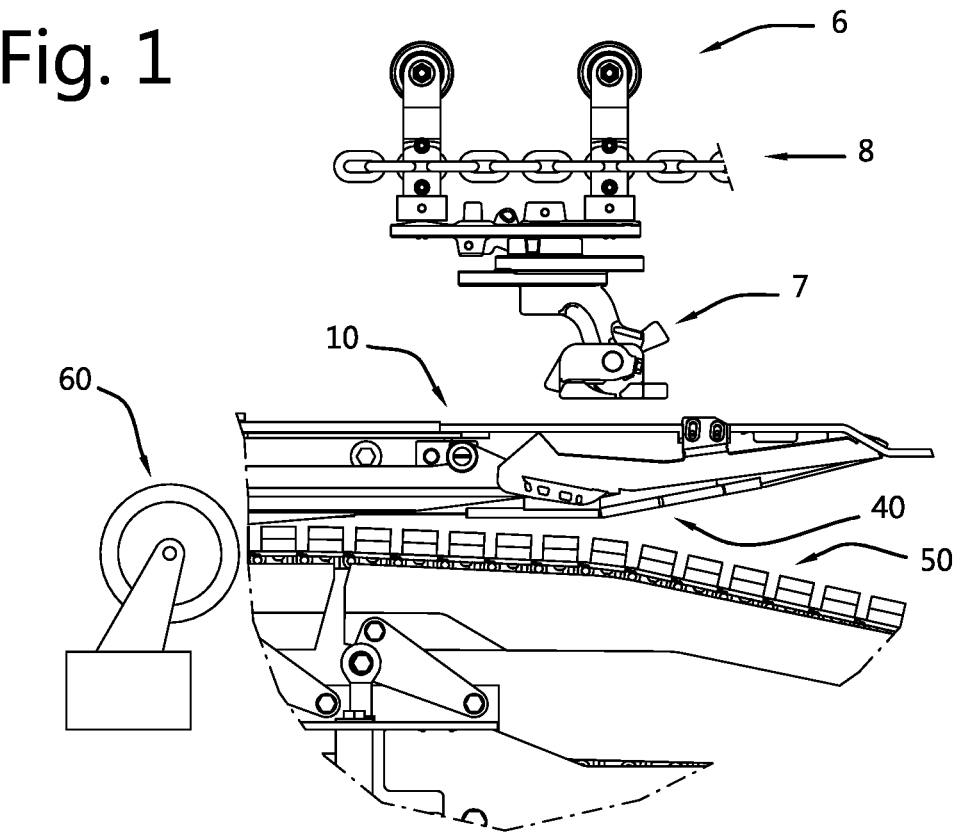
FIG. 1 shows an embodiment of a part of a system according to the invention, in side view.
Figure 2:
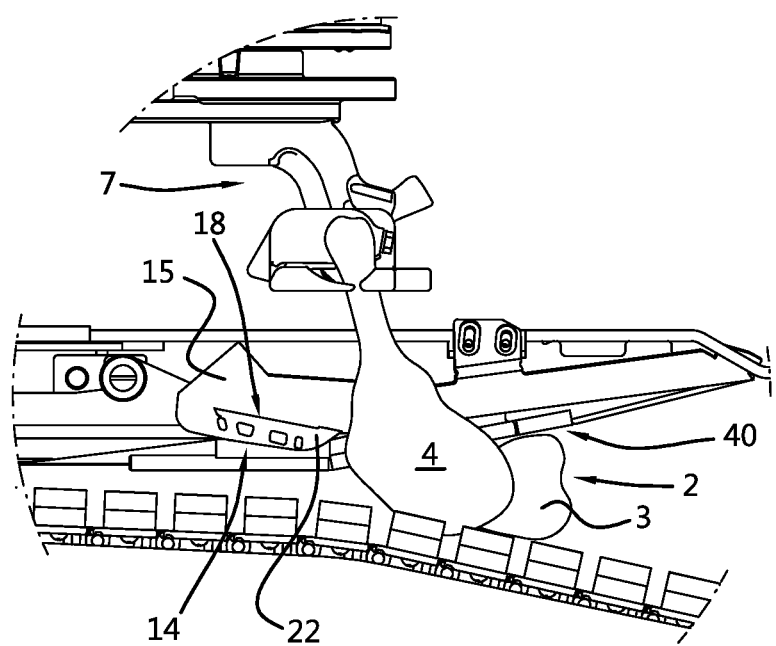
FIG. 2 shows a detail of FIG. 1, including a slaughtered poultry carcass part.

FIGS. 1-4 show a system 1 for processing slaughtered poultry carcass parts (one carcass part 2 shown in FIG. 2 at least comprising a back portion 3 and legs 4 connected thereto. See also FIGS. 8a and 8b. The carcass part is preferably a so called backhalve. The system 1 has a conveyor 6 for moving the carcass parts 2 in a suspended manner in a conveying direction 8 with the legs 4 hanging from the conveyor 6 in use of the system 1. See also FIG. 2. As commonly used in poultry processing, successive carcass parts are moved by the conveyor in use, each carcass part being carried by a respective successive carrier 7 of the conveyor 6. Only one such carrier is shown in FIG. 1.

Figure 3:
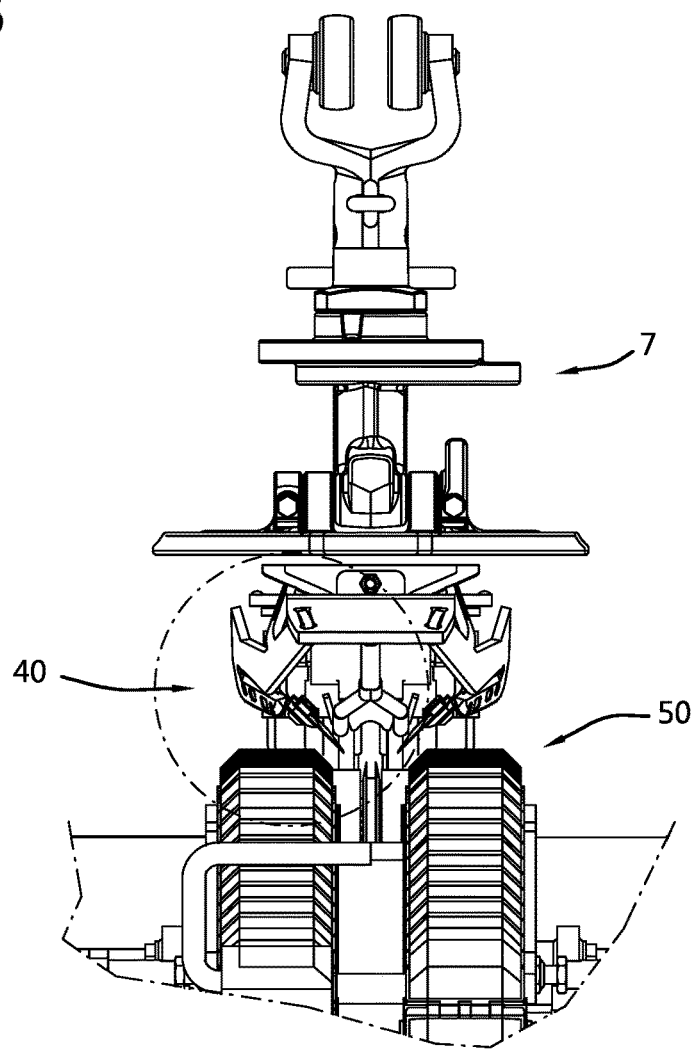
FIG. 3 shows the system of claim 1, seen in the conveying direction.
Figure 4:
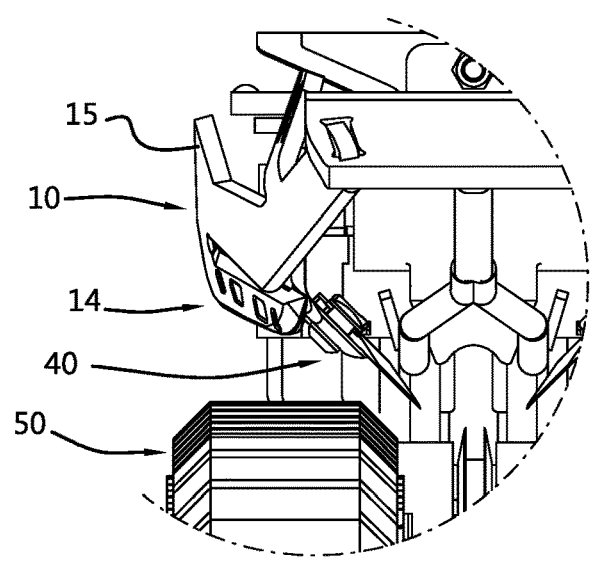
FIG. 4 shows a detail of FIG. 3.

The system further comprises a groin skin cutting device 10 for cutting groin skin 12 while the carcass parts 2 move past the groin skin cutting device. For that purpose, the groin skin cutting device 10 comprises two stationary cutters 14 each for cutting groin skin 12 at an inside of each of the two respective legs 4 of the carcass part 2. For that purpose, the two stationary cutters 14 are disposed besides each other in a mirror-image manner (see FIG. 3 in particular and see FIG. 8a for a very schematic representation of the two cutters relative to the carcass part). The system 1 further has a leg positioning device 40 upstream of the cutting device 10, for spreading the legs 4 apart and positioning the legs 4 for the purpose of the subsequent groin skin cutting by the cutting device 10. The two cutters 14 which are disposed besides each other, as FIG. 3 shows, are angled inward, seen in plan view.

Each cutter 14 has an elongate base portion 16 having a cutting edge 18 and a puncturing tip 20 at an upstream end 22 of the cutter 14. See in particular FIGS. 2 and 5a-5d. The stationary cutter 14 is positioned in a fixated manner on a frame 15 of the system or at least on a part of the system which is connected to the frame in a stationary manner. The cutters 14 are each positioned and configured such that, in use, the puncturing tip 20 punctures groin skin 12 upon movement of the carcass part 2 in the conveying direction 8, thereby creating a puncture hole 24 so that the cutter 14 can then enter, partially, underneath the groin skin 12, as FIGS. 8b and 8c show in particular. The groin skin 12 is cut by the cutting edge 18 making a cut (indicated by reference sign 26 in FIGS. 8b and 8c) through the groin skin 12 starting from the puncture hole 24, as a result of the continued movement of the carcass part 2 in the conveying direction 8 past the cutting device 10 in use.

The system further comprises a back supporting device 50 which is movable in the conveying direction 8. The back supporting device 50 slightly lifts the back portion 3, which results in the legs 4 moving apart which in turn increases the available space for the puncturing and cutting operations by the cutting device 10. Another effect of the lifting of the back portion 3 by the back supporting device is that groin skin 12 may be crumpled up upstream of the cutter 14. The reason for the crumpling up is that the orientation of the legs with respect to the back part changes. The groin skin is preferably crumpled up while the carcass part passes the leg positioning device 40.

The cutter 14 is positioned such that the back portion 3 of the carcass part 2 passes underneath the cutter 14 in use. The cutting edge 18 is tilted downwards with the upstream end 22 thereof, seen transverse to the conveying direction, and as shown in FIGS. 1 and 2 in particular. This means that the cutting edge 18 is tilted downwards with respect to the part of the back supporting device 50 directly below the cutter 14.

The cutter 14 is wedge shaped at least at the upstream end 22 thereof, for tensioning groin skin 12 for the purpose of making the cut through the groin skin. See in particular the top view of FIG. 5d. The cutter 14 is positioned and configured such that, is use, the slaughtered poultry carcass part 2 passes with a leg 4 thereof at an outside of the cutter 14 along an outer longitudinal side 28 of the cutter 14 which outer longitudinal side 28 faces an inside of the leg 4. The base portion 16 has a thickness t adapted to a largest thickness of the wedge shaped upstream end 22 as shown in FIG. 5d, wherein the cutting edge 18 is provided at an inner longitudinal side 30 of the cutter 14 opposite to the outer longitudinal side 28. The stationary cutter 14 also comprises a guiding portion 32 at the upstream end 22, wherein the cutting edge 18 starts downstream of the guiding portion 32, as in particular shown in FIGS. 5a and 5d. By this is meant that the guiding portion 32 is free from a cutting edge. The cutter 14 is positioned and configured such that, in use, after that the puncturing tip 20 has created the puncture hole 24 so that the cutter 14 enters underneath the groin skin, the groin skin slides, that means without already being cut, over the guiding portion 32 towards the cutting edge 18 and is subsequently cut by the cutting edge 18 making the cut 26 starting from the puncture hole 24 through the groin skin 12. During the sliding, the groin skin is also stretched to some extent, because of the wedge shape of the cutter 14.

Also, in an embodiment very schematically shown in FIG. 9, the cutting device 10 may have a bypass element 60, in the example of FIG. 9 formed as an elongate strip-shaped element, in an active position thereof as shown in FIG. 9 covering at least the puncturing tip 20 at the upstream end 22 of the cutter 14, and such that in use poultry carcasses moved along the cutting device remain out of reach of the cutters 14 so that groin skin is not punctured and cut. This may be at issue for processing a specific batch of poultry carcasses for which the cutting device is not needed. The bypass element 60, as well as the cutter 14, are provided on a frame 115 of the system. The bypass element 60 may be moved, such as pivoted in the direction 61 about a pivot axis 62 as shown in the example of FIG. 9, from a second position shown in FIG. 9 in which the bypass element 60 covers at least the puncturing tip of the cutter such that the puncturing tip is prevented from puncturing groin skin, thereby preventing the groin skin to be cut by the cutting edge, to a first position in which, in use, the puncturing tip punctures groin skin upon movement of the carcass part in the conveying direction past the groin skin cutting device. That means, in the first position, the bypass element 60 is pivoted away from the cutter 14 such that the puncturing tip is no longer covered by the bypass element and can thus be used in the manner as described above for puncturing and cutting. The movement of the bypass element may be provided by means not shown, such as by an electromotor, solenoid or pneumatical actuator.

FIG. 5e shows a cutter 414, being a variant of the embodiment of FIGS. 5a-d, the only difference with cutter 14 being that the upstream end 422 of the cutter 414 is curved inward, seen in plan view, which means that the upstream end 422 bends away from the leg, as it were.

FIGS. 6a-6c show another embodiment of a cutter which can be used in the system 1 instead of the cutter 14. The cutter 114 of FIGS. 6a-6c is flat. It thus lacks the wedge-shaped upstream end. The cutter 314 as shown in FIG. 6d, being a variant of the cutter 114, also has an inwardly curved upstream end 322, like cutter 414. FIGS. 7a-7c show yet another embodiment of a cutter which can be used in the system 1 instead of the cutter 14. The cutter 214 of FIGS. 7a-7c does have a wedge-shaped upstream end 222, but it does not have a guiding portion. This means that its cutting edge 218 starts at the puncturing tip 220. In an embodiment, a thickening part may be added to the cutter 114, so that as a result a cutter comparable to the cutter 214 is obtained, having a wedge-shaped upstream end, but with the difference that cutter 214 is made as one part while said cutter having a thickening part is composed of two individual parts. The analogue holds for cutter 314, to which a thickening part may be added as well. Also, the cutters 14, 214 and 414 may be composed of more than one individual parts so as to obtain the overall shape as depicted in the figures.

The system further comprises a separation device 60 (shown only very schematically in FIG. 1) which is provided downstream of the stationary cutter 14 and which is configured for separating the legs 4 from the back portion 3. The separation device may comprise a cutting element as shown (a circular rotating blade) or may comprise a pulling element, for example, for pulling the back portion downward with respect to the legs for the purpose of the separation.

According to a method according to a present invention, the carcass parts 2 are moved in a suspended manner by a conveyor 6 in a conveying direction 8, with the legs 4 hanging from the conveyor; and comprising, while the carcass part moves past the groin skin cutting device 10, puncturing groin skin 12 with the puncturing tip 20 of the cutter 14, and then cutting groin skin by the cutting edge 18.

Other variations to the disclosed embodiments can be understood and effected by those skilled in the art in practicing the claimed invention, from a study of the drawings, the disclosure, and the appended claims. The foregoing description provides embodiments of the invention by way of example only. The scope of the present invention is defined by the appended claims. One or more of the objects of the invention are achieved by the appended claims.

The invention claimed is:

1. A system for processing a slaughtered poultry carcass part at least comprising:
   a back portion and legs connected thereto;
   a conveyor for moving the carcass part in a suspended manner in a conveying direction with the legs hanging from the conveyor in use of the system;
   a groin skin cutting device for cutting groin skin while the carcass part is moved past the groin skin cutting device in use, the groin skin cutting device comprising a cutter having:
      an elongate base portion having a cutting edge,
      a puncturing tip at an upstream end of the cutter,
      the cutter being positioned and configured such that, in use, the puncturing tip punctures groin skin upon movement of the carcass part in the conveying direction thereby creating a puncture hole so that the cutter enters underneath the groin skin,
      wherein the groin skin is cut by the cutting edge making a cut through the groin skin starting from the puncture hole, as a result of the continued movement of the carcass part in the conveying direction in use.

2. The system according to claim 1, wherein the cutter is wedge shaped at least at the upstream end thereof, for tensioning groin skin for the purpose of making the cut through the groin skin.

3. The system according to claim 2, wherein the cutter is positioned and configured such that, in use, the slaughtered poultry carcass part passes with a leg thereof at an outside of the cutter along an outer longitudinal side of the cutter which outer longitudinal side faces an inside of the leg in use, wherein the base portion has a thickness adapted to a largest thickness of the wedge shaped upstream end, wherein the cutting edge is provided at an inner longitudinal side of the cutter opposite to the outer longitudinal side.

4. The system according to claim 1, wherein the cutter comprises a guiding portion at the upstream end of the cutter, wherein the cutting edge starts downstream of the guiding portion,
   the cutter being positioned and configured such that, in use, after that the puncturing tip has created the puncture hole so that the cutter enters underneath the groin skin, the groin skin slides over the guiding portion towards the cutting edge and is subsequently cut by the cutting edge making the cut through the groin skin.

5. A method of processing a slaughtered poultry carcass part, the carcass part being a backhalve, using a system according to claim 4, the carcass part at least comprising a back portion and legs connected thereto, the method comprising:
   moving the carcass part in a suspended manner by a conveyor in a conveying direction, with the legs hanging from the conveyor; and
   while the carcass part moves past the groin skin cutting device:
      puncturing groin skin with the puncturing tip of the cutter, and then
      cutting groin skin by the cutting edge.

6. The method according to claim 5, after that the puncturing tip has created the puncture hole so that the cutter enters underneath the groin skin, the groin skin slides over the guiding portion towards the cutting edge and is subsequently cut by the cutting edge making the cut through the groin skin.

7. The system according to claim 1, wherein the cutter is positioned and configured such that, in use, the slaughtered poultry carcass part passes with a leg thereof at an outside of the cutter, along an outer longitudinal side of the cutter, which outer longitudinal side faces an inside of the leg in use, wherein the upstream end of the cutter is curved inward, seen in plan view.

8. The system according to claim 1, wherein the cutter is positioned and configured such that, in use, the slaughtered poultry carcass part passes with a leg thereof at an outside of the cutter, along an outer longitudinal side of the cutter, which outer longitudinal side faces an inside of the leg in use, wherein the cutter is angled inward, seen in plan view.

9. The system according to claim 1, wherein the groin skin cutting device has two such cutters disposed besides each other in a mirror-image manner, for cutting groin skin along an inside of both legs of the carcass part, the system further having a leg positioning device upstream of the cutter, for spreading the legs apart and positioning the legs for the purpose of the subsequent groin skin cutting.

10. The system according to claim 1, further comprising a back supporting device which is movable in the conveying direction and arranged to support the back portion at least while the carcass part passes along the cutting device.

11. The system according to claim 1, wherein the cutting device has a bypass element configured such that in use the cutter is selectively bypassed by the carcass part so that the puncturing tip is prevented from puncturing groin skin upon movement of the carcass part in the conveying direction and thereby preventing the groin skin to be cut by the cutting edge.

12. The system according to claim 1, wherein the cutter is positioned such that the back portion of the carcass part passes underneath the cutter in use, wherein the cutting edge is tilted downwards with the upstream end thereof.

13. The system according to claim 1, further comprising a separation device which is provided downstream of the cutter and which is configured for separating the legs from the back portion.

14. The system according to claim 1, wherein the carcass part is a backhalve of a slaughtered poultry carcass, the backhalve comprising a back portion and legs connected thereto and which backhalve is moved by a conveyor in a suspended manner in a conveying direction with the legs hanging from the conveyor in use of the system.

* * * * *